(12) United States Patent
Gieger et al.

(10) Patent No.: US 8,462,654 B1
(45) Date of Patent: Jun. 11, 2013

(54) COMMUNICATIONS SYSTEM WITH BONDING ENGINE CONFIGURED FOR MAXIMUM PACKET FRAGMENT SIZE AS ADAPTED TO COMMUNICATIONS LINE PAIRS AND RELATED METHOD

(75) Inventors: Darrin L. Gieger, Huntsville, AL (US); Kevin W. Schneider, Huntsville, AL (US); Arlynn Wilson, Huntsville, AL (US); Robert A. Barrett, Madison, AL (US)

(73) Assignee: Adtran, Inc., Huntsville, AL (US)

( * ) Notice: Subject to any disclaimer, the term of this patent is extended or adjusted under 35 U.S.C. 154(b) by 230 days.

(21) Appl. No.: 12/836,659

(22) Filed: Jul. 15, 2010

(51) Int. Cl.
*G01R 31/08* (2006.01)

(52) U.S. Cl.
USPC .......................................... 370/252; 370/419

(58) Field of Classification Search
CPC ..... H04L 47/10; H04L 47/36; H04L 29/06136; H04L 29/06; H04L 29/06095
USPC .......................... 370/252, 419, 431, 468, 474
See application file for complete search history.

(56) References Cited

U.S. PATENT DOCUMENTS

| | | | |
|---|---|---|---|
| 5,515,371 A | 5/1996 | Venters | 370/66 |
| 6,563,821 B1 | 5/2003 | Hong et al. | 370/389 |
| 7,099,426 B1 | 8/2006 | Cory et al. | 375/372 |
| 7,106,760 B1 * | 9/2006 | Perumal et al. | 370/535 |
| 7,295,639 B1 | 11/2007 | Cory | 375/371 |
| 7,535,929 B2 | 5/2009 | Singhai et al. | 370/473 |
| 7,570,662 B2 | 8/2009 | Chinnaiah et al. | 370/473 |
| 7,573,834 B2 | 8/2009 | Liu et al. | 370/252 |
| 7,693,090 B1 | 4/2010 | Kimpe | 370/254 |
| 2005/0058186 A1 | 3/2005 | Kryzak et al. | 375/219 |
| 2006/0126505 A1 | 6/2006 | Denney et al. | 370/229 |
| 2006/0126660 A1 | 6/2006 | Denney et al. | 370/468 |
| 2007/0058655 A1 | 3/2007 | Myers | 370/437 |
| 2007/0097907 A1 | 5/2007 | Cummings | 370/329 |
| 2007/0160040 A1 | 7/2007 | Kwon | 370/389 |
| 2008/0130659 A1 * | 6/2008 | Polland | 370/395.52 |
| 2008/0144495 A1 * | 6/2008 | Frank | 370/230 |
| 2008/0205287 A1 * | 8/2008 | Kuhl et al. | 370/252 |
| 2009/0135850 A1 | 5/2009 | Hong et al. | 370/468 |
| 2010/0027557 A1 * | 2/2010 | McGarry et al. | 370/431 |

OTHER PUBLICATIONS

Parekh et al., "*A Generalized Processor Sharing Approach to Flow Control in Integrated Services Networks: The Single-Node Case,*" IEEE/ACM Transactions on Networking, vol. 1, No. 3, Jun. 1993, pp. 344-357.

(Continued)

*Primary Examiner* — Jung Park
(74) *Attorney, Agent, or Firm* — Fish & Richardson P.C.

(57) ABSTRACT

A communications system includes at least one telecommunications access module coupled to a plurality of communications subscriber line pairs and comprising at least one bonding engine. A module is configured to receive a provisioning request and determine the total number of communications subscriber line pairs available to form a bonding group and select at least one bonding engine for the bonding group. A data processor is configured to determine a maximum packet fragment size for the data packets based on the total number of available subscriber line pairs forming the bonding group. A maximum packet fragment size is adapted to the number of communications line pairs within the bonding group and the bonding engine fragments the data packets into the packet fragments. A transmitter receives the packet fragments and transmits the packet fragments over the communications subscriber line pairs forming the bonding group.

21 Claims, 7 Drawing Sheets

OTHER PUBLICATIONS

Parekh et al., "*A Generalized Processor Sharing Approach to Flow Control in Integrated Services Networks: The Multiple Node Case*," IEEE/ACM Transactions on Networking, vol. 2, No. 2, Apr. 1994, pp. 137-150.

Shreedhar et al., "*Efficient Fair Queuing Using Deficit Round-Robin*," IEEE/ACM Transactions on Networking, vol. 4, No. 3, Jun. 1996, pp. 375-385.

\* cited by examiner

US 8,462,654 B1

COMMUNICATIONS SYSTEM WITH BONDING ENGINE CONFIGURED FOR MAXIMUM PACKET FRAGMENT SIZE AS ADAPTED TO COMMUNICATIONS LINE PAIRS AND RELATED METHOD

FIELD OF THE INVENTION

The present invention relates to communications systems, and more particularly, this invention relates to communications systems that use bonding engines configured to bond together a plurality of communications links as subscriber line pairs.

BACKGROUND OF THE INVENTION

Link bonding, which is also referred to as Ethernet bonding, channel bonding, or network bonding in some instances, allows two or more transmission channels, such as communications subscriber line pairs (e.g., in a xDSL system), to be combined at the symbol, bit, byte, frame or flow level for creating a virtual transmission channel having a higher bandwidth than a single transmission channel. This bonding across multiple communications line pairs, also termed "links," provides Ethernet over Copper (EoCu) products the ability to create high bandwidth communications pipes for communication of Ethernet and similar data traffic. By bonding multiple copper subscriber line pairs together, higher bandwidth services can typically be provided over long distances while higher speeds are accomplished over the multiple bonded subscriber line pairs. This bonded data link, also termed Ethernet in the First Mile (EFM), typically treats the multiple copper lines as a unified physical layer. For example, the IEEE 802.3ah Standard, the disclosure which is hereby incorporated by reference in its entirety, provides an ability to auto-detect which pairs are connected between two devices and are, therefore, eligible to be aggregated into a single Ethernet connection. Another example is the G.998.2 Recommendation, for example, as applied with Single-pair High-speed Digital Subscriber Line (SHDSL) for Ethernet-Based Multi-Pair Bonding, the disclosure which is hereby incorporated by reference in its entirety. An example of a bonding system is found in commonly assigned U.S. Pat. No. 7,693,090, the disclosure which is hereby incorporated by reference in its entirety, where the bonding system discovers physical medium entities (PME's) as an example. Some of these bonding systems are delay and jitter sensitive, and it is desirable to overcome the technical problems associated with these delay and jitter sensitive bonding systems.

Additionally, there are some algorithms that fragment large packets over the subscriber line pairs forming bonding groups. These algorithms sometimes lead to undesirable results in throughput and latency performance of the packets across the bonding group. Some users of such systems are interested in maximizing throughput over the bonding group, but the latency characteristics such as the maximum delay and delay variations become increasingly important and should be addressed. It is desirable to use an algorithm that leads to a minimal delay for packet transmission across the bonding group. The motivation for this technical problem is driven by upstream data rates over EFM-bonding ADSL loops, but may apply generally to any fragmentation over bonded links in a bonding group.

SUMMARY OF THE INVENTION

A communications system includes at least one telecommunications access module coupled to a plurality of communications subscriber line pairs and comprising at least one bonding engine. A module is configured to receive a provisioning request and determine the total number of communications subscriber line pairs available to form a bonding group and configured to select at least one bonding engine for the bonding group. A data processor is configured to determine a maximum packet fragment size for the data packets based on the total number of available subscriber line pairs forming the bonding group. A maximum packet fragment size is adapted to the number of communications line pairs within the bonding group and the bonding engine fragments the data packets into packet fragments. A transmitter receives the packet fragments and transmits the packet fragments over the communications subscriber line pairs forming the bonding group.

In one example, the bonding group comprises the total number of subscriber line pairs as an "n" number of subscriber line pairs and the maximum fragment size comprises a packet frame size divided by "n." The processor in another example is configured to readjust the maximum packet fragment size when one of the communications subscriber line pairs within the total number of subscriber line pairs goes out of service. Each packet fragment comprises a fragment header containing a port address for a respective subscriber line to which the respective packet fragment is assigned in another example. A switching module in one example switches packet fragments among the respective subscriber line pairs forming the bonding group based on the port address fragment header. The processor in an example is configured to divide the data packet into "n" number of packet fragments of equal size based on "n" number of idle subscriber line pairs during initial provisioning of the at least one telecommunications access module.

A method aspect is also set forth.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

In accordance with a non-limiting example, the system statically or dynamically assesses the number of lines in a bonding group, and in this non-limiting example, determines the maximum G.998.2 fragmentation size. This typically occurs during the provisioning sequence.

Figure 1:
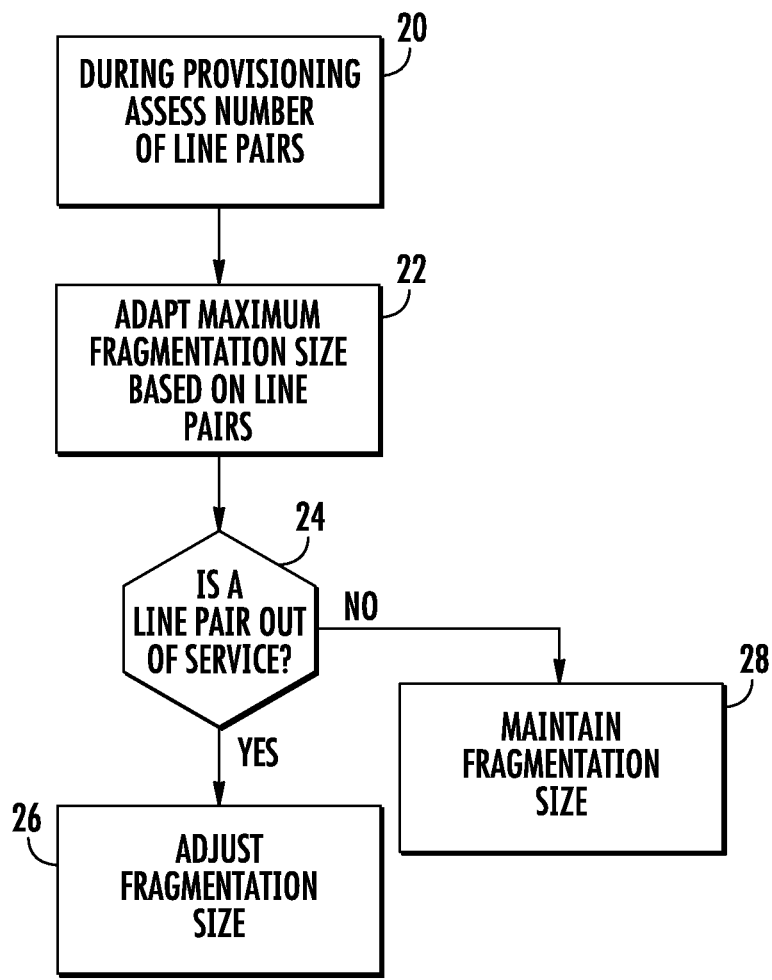
FIG. 1 is a high-level flowchart showing an example of a sequence typically used during provisioning that adapts maximum fragmentation size based on subscriber line pairs in a bonding group in accordance with a non-limiting example.

As shown in the high-level flowchart of FIG. 1, the number of subscriber line pairs is assessed, for example, during initial provisioning (block 20). Packets are fragmented and the maximum fragmentation size is adapted based on the number of subscriber line pairs or "links" (block 22). A determination is made if a line pair is out of service (block 24) in this example. If the line pair is out of service, the fragmentation size is adjusted (block 26). If a line pair is not out of service, the fragmentation size is maintained (block 28). Thus, the maximum fragmentation size is adjusted based on the number of subscriber line pairs and typically accomplished at provisioning.

As a non-limiting example, to minimize delay and jitter of a 1514 byte Ethernet frame on six subscriber line pairs, the packet frame would be broken or fragmented with a maximum fragmentation size of 1514/6, i.e., 253 bytes. The same frame over 12 subscriber line pairs, however, is fragmented using a maximum fragmentation size of 127 bytes, assuming that the channel had excess capacity. Currently in some systems, the maximum fragmentation size operates with the lowest possible overhead as a percentage of data rate. The algorithm as set forth adapts the maximum fragmentation size to the number of pairs in the bonding group. This algorithm is typically applied at provisioning, i.e., when the number of pairs in a bonding group are provisioned. Thus, the packet is divided into "n" number of packet fragments of equal size based on "n" number of idle subscriber line pairs during initial provisioning.

Figure 3:
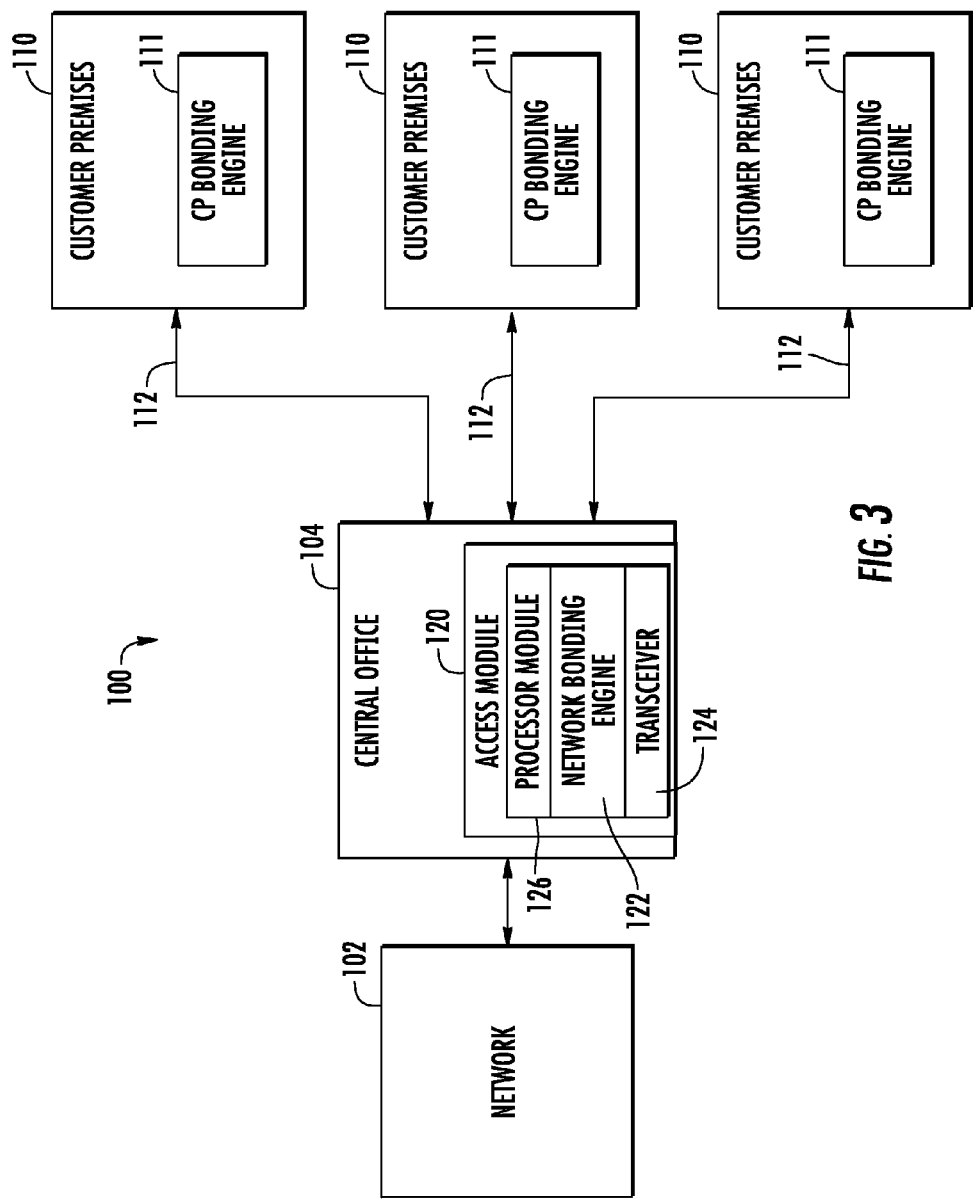
FIG. 3 is a block diagram showing an embodiment of a communications system having a network, a central office facility, including a telecommunications access module and network bonding engine, and communicating with a plurality of customer premises in accordance with a non-limiting example.

Typically, the total number of communications subscriber line pairs are assessed within the bonding group and the data packets are fragmented into packet fragments within at least one bonding engine such as shown in FIG. 3, which is described in further detail below. At least one telecommunications access module includes a bonding engine such that the maximum packet fragment size is adapted to the number of communications line pairs forming the bonding group. The packet fragments are distributed among the total number of subscriber line pairs within the bonding group. The packet fragments are transmitted along the bonded communications channel.

In one non-limiting example, the bonding group is formed as a total number of subscriber line pairs as an "n" number of subscriber line pairs and the maximum fragment size comprises a packet frame size divided by "n" as in the example described above. The maximum packet fragment size is distributed on every subscriber line forming the bonding group in one non-limiting example. The maximum packet fragment size is distributed until the fragmented packet has been transmitted.

The system in another example inserts into each packet fragment a fragment header containing a port address for a respective subscriber line to which that respective packet fragment is assigned. Although this adds an increased overhead, the packet fragment is switched to the port address within the telecommunications access module corresponding to the respective subscriber line pair. During initial provisioning in a non-limiting example, a provisioning request can be received to configure the plurality of communications subscriber line pairs.

The system as described is particularly relevant when applied at provisioning, i.e., when the number of pairs in the bonding group are provisioned. During packet delivery, however, those algorithms that fragment the large packets over the bonded data links lead to the undesirable results in terms of throughput and latency performance of packets across the bonding group. It is desirable to maximize throughput over the bonding group, but the latency characteristics such as the maximum delay and the delay variation are increasingly affecting performance. An extension of the algorithm previously described relative to maximum fragment size is now set forth. The enhanced algorithm provides for minimal delay for packet transmission across a bonding group.

As noted before, it is desirable to compute an estimated time that the fragments will complete transmission for each packet and dynamically adapt the fragment size on a packet-by-packet basis. This algorithm would not be applied at provisioning, but is adapted during packet delivery.

Figure 2:
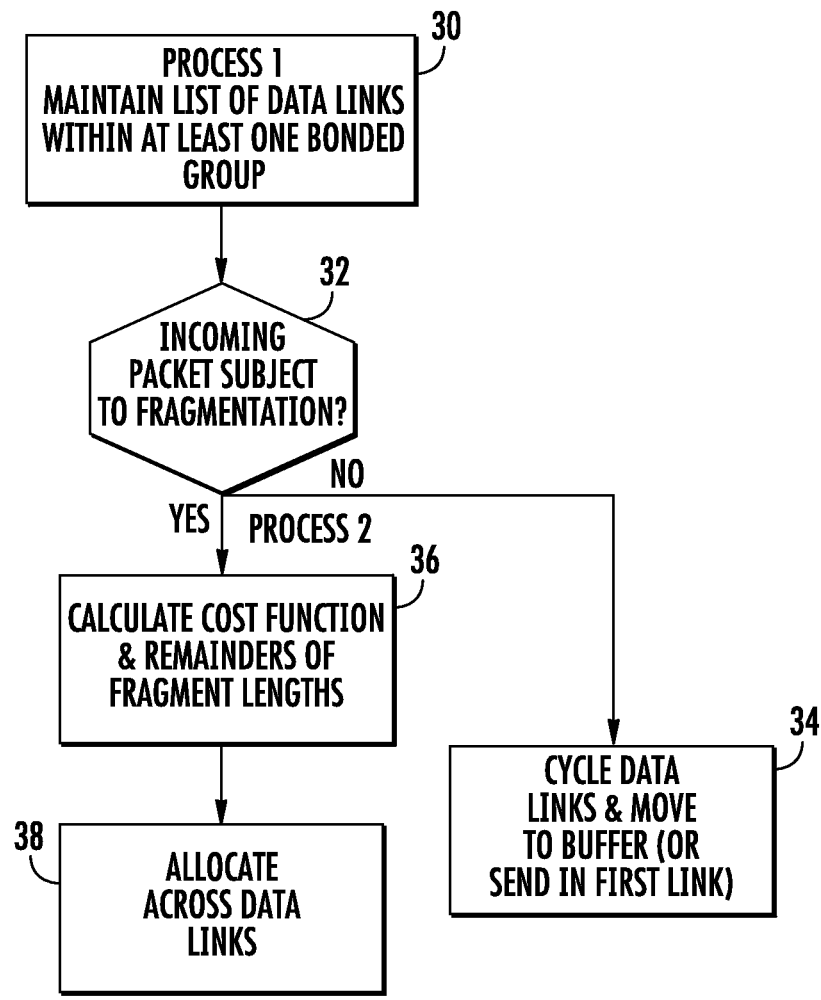
FIG. 2 is another high-level flowchart showing an example of the sequence that implements a minimum delay for packets transmitted across a bonding group in accordance with a non-limiting example.

FIG. 2 is a high-level flowchart showing an example sequence for the algorithm that is adapted during packet delivery. This flowchart illustrates a high-level iteration procedure that involves two processes that run in tandem, which can both be implemented using different techniques, including in an ASIC, processor or a Field Programmable Gate Array (FPGA) as a non-limiting example. After describing this high-level sequence, other details are set forth. In this high-level flowchart, process one and process two are indicated. A list of data links as the subscriber line pairs are maintained and correspond to at least one bonding group (block 30). A determination is made if an incoming packet is subject to fragmentation (block 32). If not, then the system cycles the data links as the subscriber line pairs and moves data to a fragmentation buffer (block 34). If there is an unsorted list, however, unfragmented packets will go out over the first link in the list. If yes, the cost function is calculated together with the remainders of fragment lengths (block 36). The packet fragments are allocated across the data links (block 38). This method as described in further detail below schedules the packet fragmentation to ensure the last packet fragment is delivered as soon as possible. It should be understood that all packets can be moved to a fragmentation buffer, regardless of whether they are fragmented. Thus, the system has no substantial difference between fragmented and unfragmented packets. It is possible to have either a sorted list of links or the system can cycle through all links in the list. This is regardless of whether the packet is fragmented or unfragmented. If a sorted list is chosen, then unfragmented packets will go out over the first link in the list, while fragmented packets will go out over the first few links. If there is an unsorted list that the system cycles through, then for fragmented packets, the system will cycle through the list as well.

In the first process, a list of data links is maintained within at least one bonding group (this can be a sorted or unsorted list as described above). In a second process, a determination is made whether an incoming packet is subject to fragmentation across multiple data links as subscriber line pairs. If the incoming packet can be fragmented, a cost function is calculated for minimum packet fragment sizes. Remainders of packet fragmentation links are calculated and allocated across the data links as the subscriber line pairs. This can include allocating packet fragment sizes between minimum and maximum values to all assigned data links.

If the answer is no as indicated in the flowchart, and a determination is made that an incoming packet cannot be fragmented, then as many data links as subscriber line pairs from the list are cycled (or go out over the first link as described above) within the time it takes for a bonding engine to move the packet into a fragmentation buffer.

The estimated time that the fragments will complete transmission for each packet is calculated. The system dynamically adapts the fragment size on a packet-by-packet basis. This algorithm as the example method does not typically apply to provisioning as compared to the system and method for maximum fragment size as described relative to the sequence in the flowchart of FIG. 1.

This algorithm as described minimizes a "cost function," which is proportional to the end-of-fragment arrival time at the far end of each member link as a subscriber line pair. By jointly optimizing the approximate arrival time of all assignable fragments in a packet, the resulting latency will be as small as possible over the bonding group. The iterative procedure has two processes running in tandem. Both processes can be implemented using different configurations, including an ASIC, a processor or a Field Programmable Gate Array (FPGA) within the bonding engine.

The first process maintains a list of links within each bonding group (which in one example is sorted), where the front of the list is occupied by the link as a subscriber line pair whose far end would receive the minimum-sized fragment first. This "cost function" takes into account the differential delay of the link relative to other links in the bonding group, the payload rate of the link, and the amount of data already buffered for that link yet to be transmitted.

The second process operates on the incoming packets that are subject to fragmentation across the links within a bonding group. This process determines whether the incoming packet is long enough to fragment across multiple links. If not, this process cycles through as many links from the list as possible within the time it takes for the bonding engine to move the packet into its fragmentation buffer. As it cycles through the list, it compares the cost function at the packet length of interest, and chooses the one link of minimum cost to transmit the entire packet. Otherwise, if the packet is long enough to fragment, the following routine is processed:

1) The minimum fragment length is assigned to the next link in the list, keeping track of the remainder.

2) Again, the minimum fragment length is assigned to the next link in the list, keeping track of the remainder.

3) For all previously allocated links in the group, assign (subject to maximum fragment size constraint) from the remainder the number of bytes that would approximately equalize their cost function. If the remainder runs out before all links are equalized, continue to step 7.

4) If the remainder is equal to or greater than the minimum fragment size, the next best link is retrieved from the sorted list and continue to step 5, otherwise continue to step 6.

5) Calculate the cost function for the minimum fragment size over the next link. The result is compared with the addition that would be incurred by spreading the remainder among the already assigned links. If the next link cost is less, proceed to step 2, otherwise continue to step 6.

6) Spread the remaining bytes (subject to maximum fragment size constraint) across all assigned links to approximately equalize cost functions.

7) All assigned links have been allocated fragment sizes between the minimum and maximum value. If there are any remaining bytes in the packet, reiterate from step 1 after the first link becomes available.

There now follows greater details of example components and a communications system that allows the bonding algorithms as described relative to FIGS. 1 and 2 to be implemented. It should be understood that typically a bonding engine within a network receives a data stream to be communicated to a customer premises (CP) and divides the data across subscriber lines extending from a network facility (e.g., a central office facility) to the customer premises. A bonding engine at the customer premises receives the data from the multiple subscriber lines and reassembles the data to form the original data stream received and divided by the network bonding engine. Similarly, a data stream to be communicated from the customer premises through the network is received by the CP bonding engine, which divides the data across the multiple subscriber lines. The network bonding engine receives such data and reassembles the data to form the original data stream received and divided by the CP bonding engine.

In a network facility, such as the central office, subscriber lines are terminated by circuitry residing on a "line card" typically a printed circuit board as part of a rack mounted module. There can be as many as several thousand line cards at one facility. These line cards are typically held in slots of several chassis. Each line card is also typically interfaced with a chassis backplane that enables the line card to communicate with various network devices and other equipment.

FIG. 3 is a non-limiting example of a communications system 100 that uses the algorithms as described above. The system 100 includes a network 102, such as the Public Switched Telephone Network (PSTN) or Internet, that routes data. A network facility, such as a central office (CO) 104, receives from the network 102 data destined for equipment or other devices at customer premises (CP) 110 (including bonding engine 111) and transmits data to the customer premises via a plurality of communication links, such as the illustrated subscriber line pairs 112. Further, data from the customer premise 110 are received by the central office 104, which interfaces such data with the network for routing. Different protocols may be used for communication between the central office 104 and the customer premises 110, for example, various digital subscriber line (DSL) protocols, such as Asymmetric Digital Subscriber Line (ADSL), ADSL2, VDSL2, High-Bit-rate Digital Subscriber Line (HDSL), HDSL2, HDSL4, Very-high-data-rate Digital Subscriber Line (VDSL), etc. In other embodiments, other types of protocols may be used to communicate data between the central office 104 and the customer premises 110.

As shown in FIG. 1, the central office 104 includes at least one telecommunications access module 120, which includes at least one bonding engine 122. This access module includes a transceiver 124 and a processor module 126. The transceiver 124 and processor module 126 could be separate from or integral with the bonding engine 122. The access module could include other components as will be explained in greater detail below, including ports, memory, interfaces and buses.

The access module 120 typically can be formed as a Physical Medium Entity (PME) with each length terminated at one end via a network PME and the other end via a remote PME at the customer premises. The customer premises would also include a transceiver and typical processors using data processing logic with various customer premises equipment. The customer premises can include different types of processors, various ports, registers, databases, memory and control logic, including various registers and backplane interfaces. The bonding engine could be formed using different configurations, including an ASIC, a processor or a Field Programmable Gate Array.

Figure 4:
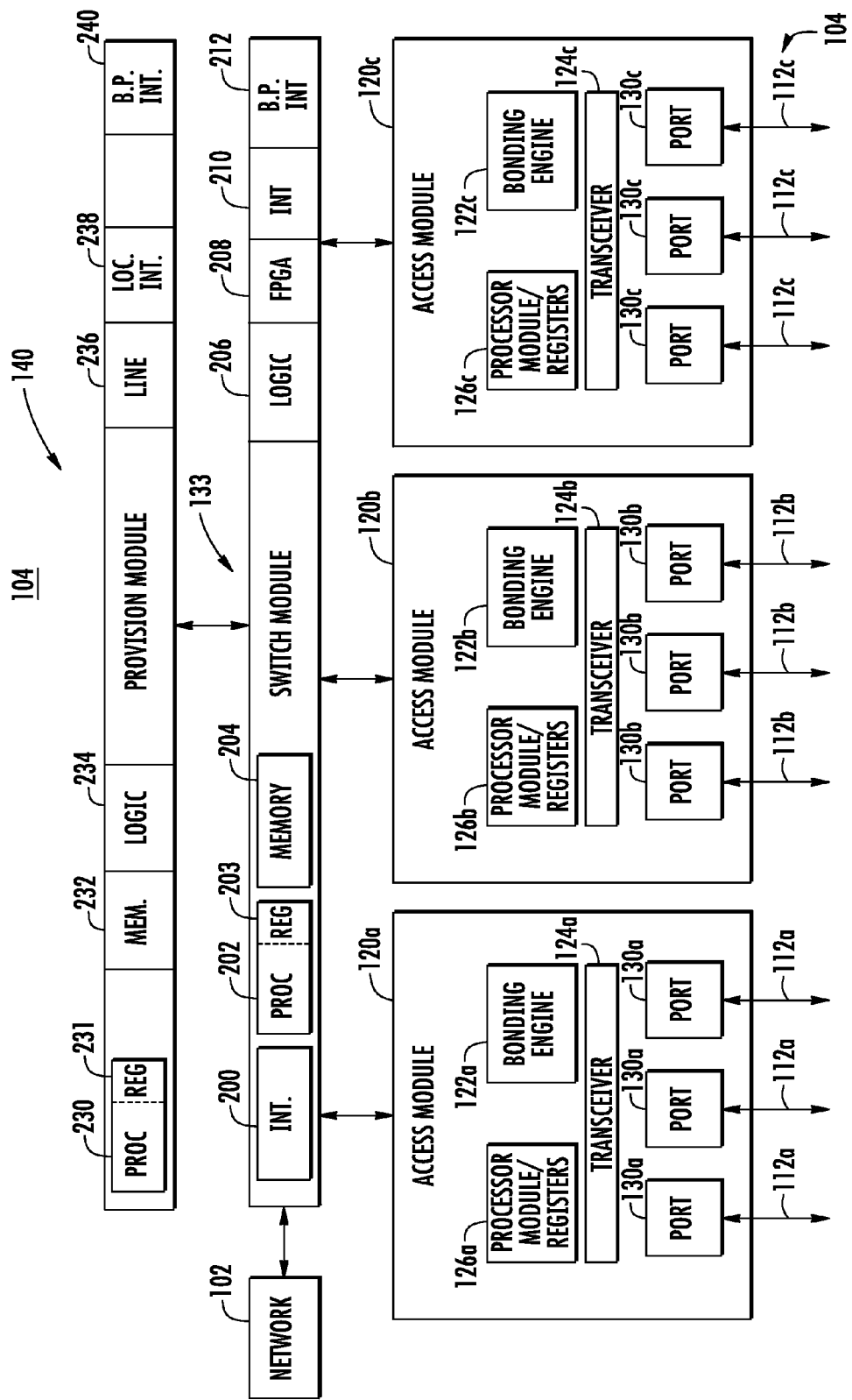
FIG. 4 is a block diagram showing greater details of the central office facility that includes a plurality of telecommunications access modules, a switch module and provision module in accordance with a non-limiting example.

FIG. 4 is an example of the bonding system components located, for example, at a central office 104. The central office has a plurality of access modules 120a-c that are coupled to and terminate subscriber lines 112a-c. In particular, the access modules have ports 130a-c that are respectively coupled to and interfaced with subscriber lines 112a-c. Each port has a unique address that identifies the port from the other ports of the other access modules. The port addresses may be used to switch data among the modules as will be described in more detail below.

As shown in FIG. 4, each access module 120a-c has at least one bonding engine 122a-c and at least one processor module 126a-c, which in one example, could be formed as a microprocessor or other controller. The processor module includes registers and associated circuitry, for example, any memory and control logic, which could be separate or part of the processor module. Each access module is coupled to a switch module 133, which switches data between the access modules and the network 102. A provision module 140 is illustrated. In this example, the switch module 133 receives from the network 102 data packets that are destined for equipment at the customer premise. Each data packet includes a header and a data portion. Control and routing information is included in the header, and payload data is included in the data portion. As an example, the header of the data packet may include a destination address identifying a communication device at the customer premises 110 to which the data packet is to be routed. In one non-limiting example, the header includes a Virtual Local Area Network (VLAN) tag. Other types of information may be included in the header, as is known in the art. In an example, the data packets are formed in accordance with Ethernet protocol, but other types of packet protocols may be used in other embodiments.

For each packet received from the network 102, in this non-limiting example, the switch module 133 transmits the packet to the appropriate access module based on information in the packet's header, such as the destination address or VLAN tag included in the header. In one example embodiment, all of the packets to be carried by the same bonding group (e.g., having the same destination address or VLAN tag) are routed to the same access module, but this is not necessary and routing could be to other access modules. When an original data packet is received by an access module, the bonding engine is configured to fragment the original data packet into a plurality of fragments. Each of the fragments is to be transmitted by a respective one of the subscriber lines of the bonding group. For each packet fragment, control and routing information is included in the header, and payload data is included in the data portion. As an example, the header may identify the port address of the port 130a-c that is coupled to the subscriber line 112a-c that is to carry the packet fragment. In one example embodiment, fragments are packetized in accordance with the same protocol used for the original data packet, e.g., typically Ethernet protocol, which is preferred.

One or more of the subscriber lines 112a-c of a bonding group may be coupled to and terminated by the same access module on which the group's bonding engine resides. In that example, it is unnecessary for the fragments carried by such subscriber line to be transmitted through the switch module 133. When a bonding engine such as at 122a provides a fragment to be carried by its respective subscriber line 112a, the fragment is transmitted directly to the port 130a coupled directly to such subscriber line without being communicated through the switch module 133. However, fragments provided by the bonding engine 122a to be carried by subscriber lines 112b-c terminated by other modules 120b-c are transmitted to the switch module 133. For each such fragment, the switch module 133 analyzes the fragment's header, and based on the port address of such fragment, transmits the fragment to the access module 120b-c on which the identified port 130b-c resides. Thus, any of the bonding engines can bond any of the subscriber lines 112 regardless of whether a given subscriber line is terminated by the same access module on which the bonding engine resides.

This is especially relevant to the algorithms shown relative to FIGS. 1 and 2. For example, if provisioning, the provision module 140 operates together with the various access modules and switch module 133 to provision certain ports to form a bonding group by assessing the number of available subscriber line pairs that can be used and then adapting the maximum fragmentation size based on the line pairs. This fragmentation size is maintained as long as a line pair does not go out of service. If a line pair, such as perhaps on bonding engine 122b goes out of service, the fragmentation size is adjusted and the switch module operates to switch packets among the different ports. Similarly, with the algorithm shown in FIG. 2, the switch module operates together with the access modules to adapt dynamically the fragment size on a packet-by-packet basis. That would occur after provisioning. Thus, the provision module 140 is configured to provision the access modules together with the operation of the switch module and control the bonding process performed by access modules in a desired manner.

Figure 5:
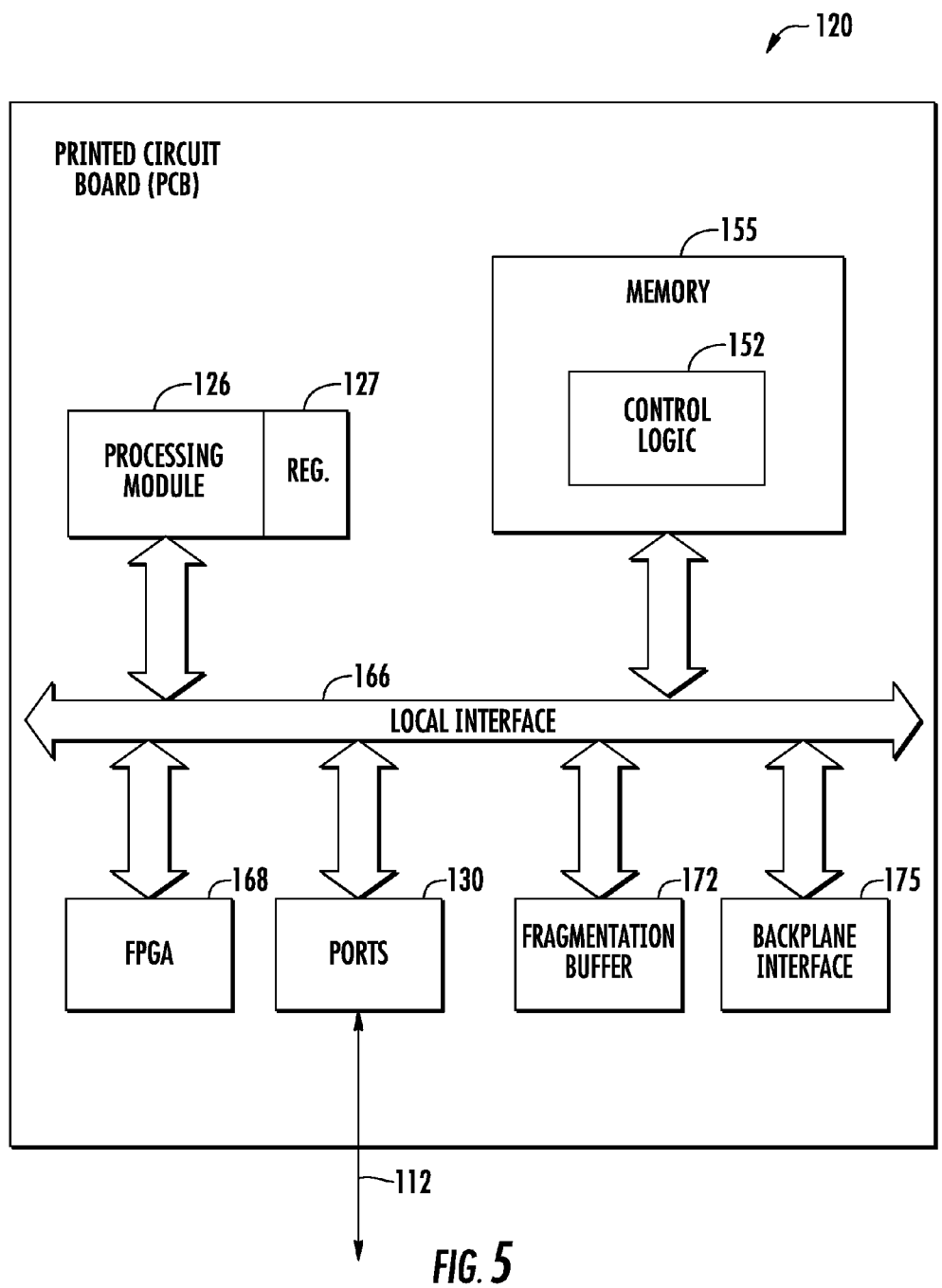
FIG. 5 is a more detailed block diagram showing an example of a telecommunications access module and various components in accordance with a non-limiting example.

Each access module 120a-c includes different hardware components configured to terminate and drive the subscriber lines 112a-c terminated by the access modules. These access modules may include, however, software, firmware, and/or other hardware for performing other functions. FIG. 5 is an example embodiment of an access module 120, which includes control logic 152 implemented in software and stored in a memory 155. The control logic 152, when implemented in software, can be stored and transported on any computer-readable medium for use by or in connection with an instruction execution apparatus that can fetch and execute instructions.

This example embodiment of the access module 120 includes the processing module 126 as noted before, for example, a digital signal processor (DSP) or a central processing unit (CPU), that communicates to and drives the other elements within the module 120 via a local interface 166, which can include at least one bus. For example, when the control logic 152 is implemented in software, the processing module 126 retrieves and executes instructions of the control logic 152. The processing module includes appropriate registers 127 in this example.

Furthermore, the access module 120 in one example includes a Field Programmable Gate Array (FPGA) 168 for implementing hardware portions of the module, such as the module's bonding engine 122 if such engine is implemented in hardware. The access module 120 also has registers as part of the processor module 126 configured to store various configuration settings. A backplane interface 175 includes a connector configured to interface the access module 122 with a backplane of a chassis (not shown) as will be described in more detail below. A fragmentation buffer 172 holds packet fragments, for example, as used with the algorithm of FIG. 2.

The registers 127 as part of the processor module 126 store various configuration settings, which preferably specify how various data packets and/or fragments are to be processed. For example, the configuration settings may indicate which of the bonding engines 122a-c receive a fragment from a particular subscriber line 112a-c terminated by an access module 122a-c. Further, the configuration settings may indicate how fragments received from a bonding group or link on another access module are to be processed.

For example, the configuration settings may correlate the destination addresses or VLAN tags of data packets from the network 102 with port addresses. A bonding engine residing on the module 122 may use the configuration settings to allocate fragments across the subscriber lines 112 of a bonding group. For example, the bonding engine 122 uses port addresses when fragmenting a data packet having the foregoing VLAN tag as described. The bonding engine 122 selects from the correlated port addresses for insertion into the fragment headers. Thus, the fragments from the data packet are transmitted to and carried by the subscriber lines of the bonding group.

The port addresses inserted into the fragment headers are used by the switch module 133 to switch the fragments. As described above, a group's bonding engine 122, based on the configuration settings in the registers of the processor module 126 and inserts a respective port address into the header of each fragment. Some of the fragments may be carried by "local" subscriber lines, and some of the fragments may be carried by "external" subscriber lines. A subscriber line is typically "local" relative to a particular access module 122 if it is coupled to a port on the access module such that the subscriber line is terminated by circuitry on that access module. On the other hand, a subscriber line is "external" relative to a particular access module if it is not terminated by that particular access module.

The switch module 133 as illustrated in FIG. 4 includes various components, including a local interface 200 and processing module 202, memory 204, control logic 206, a Field Programmable Gate Array (FPGA) 208, network interface 210, registers 203 as part of the processing module 202 and backplane interface 212 connected by various buses or local interface. The registers 203 could be separate from the processing module. The control logic 206 can be implemented in software and stored in memory and stored and transported on a computer-readable medium similar to the access module components, the processing module could be formed as a Digital Signal Processor (DSP) or a Central Processing Unit (CPU) that communicates to and drives other elements within the switch module 133 using the local interface such as at least one bus. The processing module 202 can retrieve and execute instructions of the control logic 206. The associated registers 203 are used in one example for storing various configuration settings. The backplane interface 212 includes a connector for interfacing the module with the backplane of a chassis (not shown). The FPGA 208 performs switching operations in one non-limiting example. It is possible that this switch module 133 could have a network interface coupled to a network connection such as a fiber optic cable. Configuration settings in the various registers 203 would indicate how data from a network would be switched. For example, a fragment could be received from an access module 120 and the FPGA would consult registers using the port address in the fragment's header and based on that information determine which of the modules is to receive the packet.

The provision module 140 is similarly configured with an appropriate processor module 230, registers 231, memory 232, control logic 234, line data 236 and a local interface 238 through a backplane interface 240. Provisioning requests are received into the provision module, which operates with the various access modules 120 and switch module 133, for example, at the central office 104. Any data packets received from the network 102 could have VLAN tags in their headers. Any registers could indicate where the packets are to be transmitted based on their VLAN tags.

Figure 6:
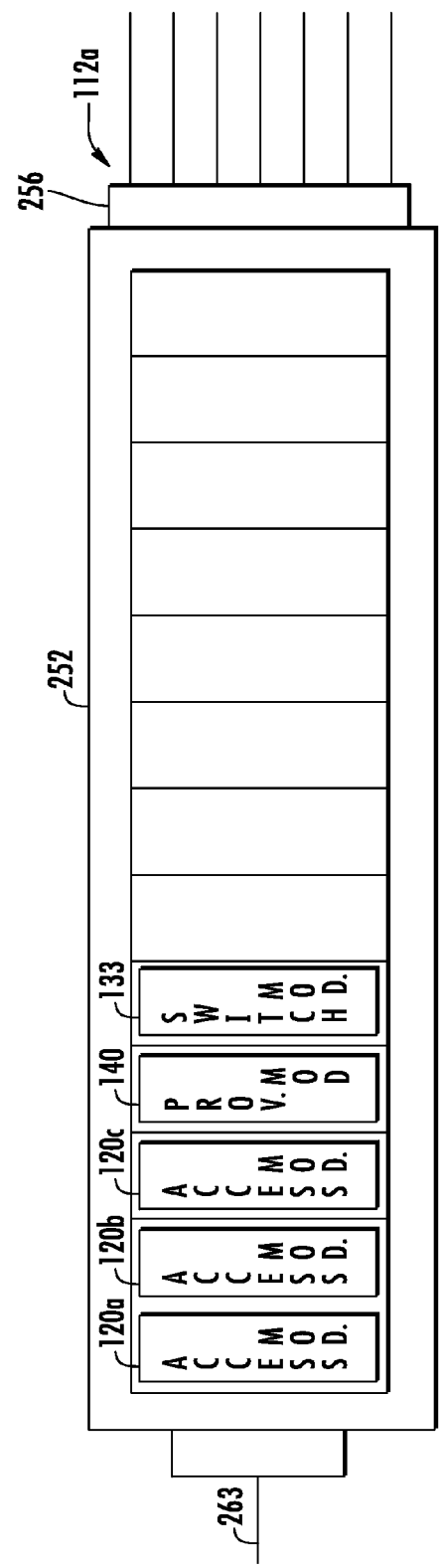
FIG. 6 is a block diagram showing an example of a chassis located at a central office facility that receives the various access modules, switch module and provision module in accordance with a non-limiting example.
Figure 7:
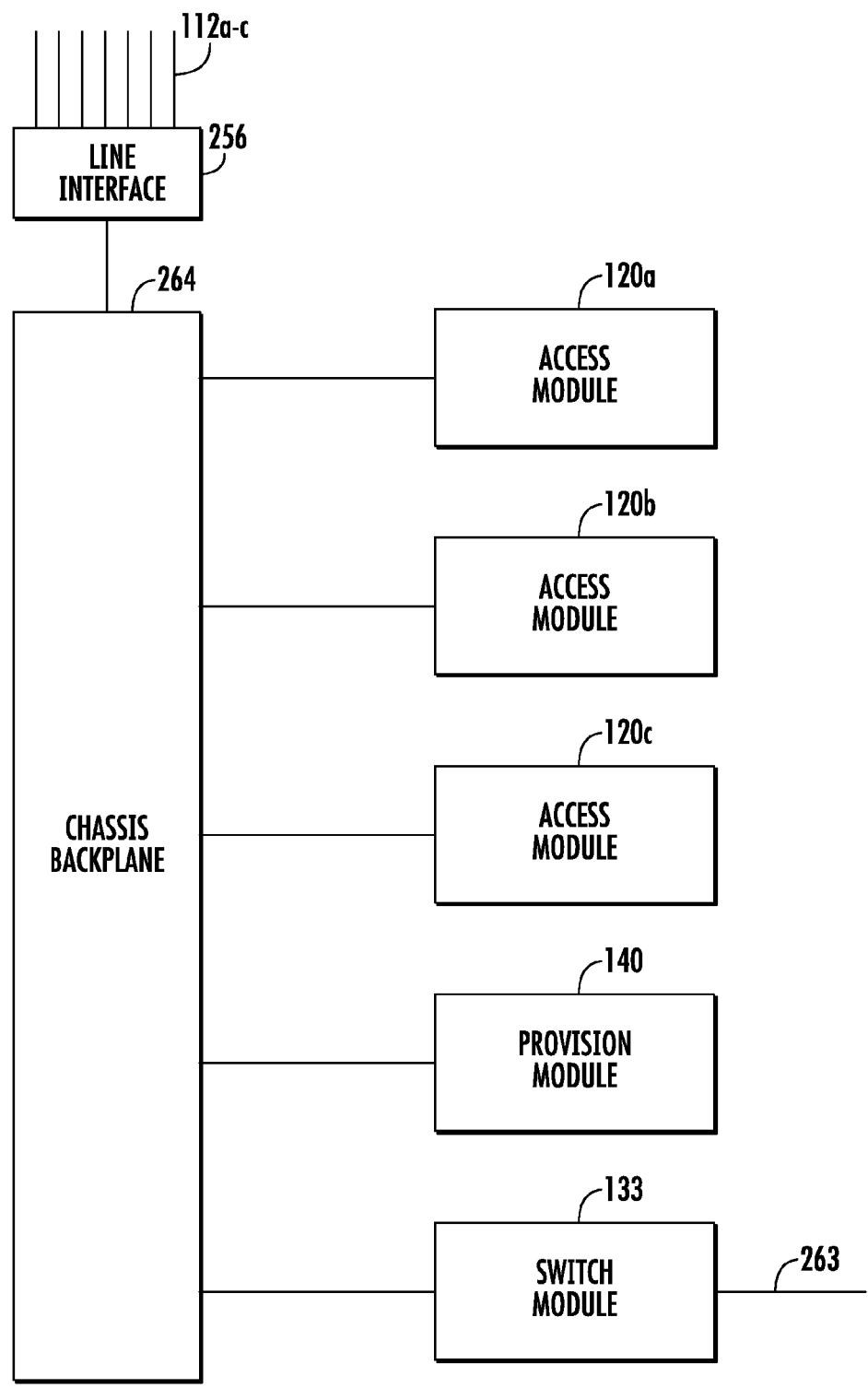
FIG. 7 is a block diagram showing an example of basic components of the access module, provision module and switch module connected to a chassis backplane in accordance with a non-limiting example.

In one non-limiting example shown in FIG. 6, the switch module 133, three access modules 122a-c, and the provision module 140 are respectively inserted into slots of a chassis 252, but any number of such modules can be inserted. Each of the subscriber lines 112a-c is coupled to a subscriber line interface 256 mounted on the chassis 252. In this embodiment, the subscriber line interface 256 interfaces the subscriber lines with a chassis backplane, which couples the subscriber lines to the access modules. The chassis backplane also couples each access module and provision module to the switch module 133. In this regard, the backplane comprises a plurality of conductive connections (e.g., copper traces) for conductively coupling the subscriber lines 112a-c and the access modules 120a-c, and provision module 140 to the switch module 133. The chassis backplane is conductively coupled to the backplane interface 175 of each access module (FIG. 5), the backplane interface 212 of the switch module 133, and the backplane interface 240 of the provision module 140.

A network connection 263, such as a fiber optic cable, for example, carrying a high-speed data stream is coupled to the switch module 133. If the network connection 263 is indeed fiber optic, the switch module 133 may include a fiber optic transceiver (not shown) to convert optical signals from the connection 263 into electrical signals and for converting electrical signals from the switch module 133 into optical signals.

The network connection 263 in another example may be coupled to the switch module 133 through the chassis backplane 264, and/or the subscriber lines and may be coupled directly to the access modules similar to how the network connection 263 is coupled directly to the switch module 133.

The provision module 140 is configured to provision the configuration settings of the different registers of the access modules and any registers of the switch module 133. In this regard, the control logic of the provision module receives a provision request indicative of a bonding group to be added. For example, the provision request may include the port address of each port that is to be coupled to a subscriber line of a particular bonding group. At this point during the provisioning, the algorithm with respect to that shown in FIG. 1 is implemented.

Although the description relative to the components shown in FIGS. 3-7 are non-limiting embodiments of a communications system that includes various access modules and components that can be used to implement the algorithms shown in FIGS. 1 and 2, it should be understood that any different types of bonding systems can be used as non-limiting examples and as suggested by those skilled in the art. Only high-level components are illustrated because numerous and different variations of network systems and arrangements of components can be used to implement the algorithms described relative to FIGS. 1 and 2.

This application is related to copending patent applications entitled, "COMMUNICATIONS SYSTEM WITH BONDING ENGINE THAT DYNAMICALLY ADAPTS FRAG- MENT SIZE," which is filed on the same date and by the same assignee, the disclosure which is hereby incorporated by reference.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A communications system, comprising:
at least one telecommunications access module coupled to a plurality of communications subscriber line pairs and comprising at least one bonding engine;
a module configured to determine the total number of communications subscriber line pairs available to form a bonding group and select at least one bonding engine for the bonding group;
a data processor module configured to determine a maximum packet fragment size for the data packets based on the total number of available subscriber line pairs forming the bonding group;
wherein said at least one bonding engine is configured to fragment the data packets to be transmitted into packet fragments within the at least one bonding engine such that a maximum packet fragment size is adapted to the number of communications line pairs within the bonding group; and
a transmitter at the at least one telecommunications access module configured to receive the data fragments and transmit the packet fragments over the communications subscriber line pairs forming the bonding group.

2. The communications system according to claim 1, wherein the bonding group comprises the total number of subscriber line pairs as an "n" number of subscriber line pairs and the maximum fragment size comprises a packet frame size divided by "n."

3. The communications system according to claim 1, wherein said processor is configured to readjust the maximum packet fragment size when one of the communications subscriber line pairs within the total number of subscriber line pairs goes out of service.

4. The communications system according to claim 1, wherein each packet fragment comprises a fragment header containing a port address for a respective subscriber line to which the respective packet fragment is assigned.

5. The communications system according to claim 4, and further comprising a switching module that switches packet fragments among the respective subscriber line pairs forming the bonding group based on the port address at the fragment header.

6. The communications system according to claim 1, wherein said processor is configured to divide the data packet into "n" number of packet fragments of equal size based on "n" number of idle subscriber line pairs during initial provisioning of the at least one telecommunications access module.

7. A method of communicating, comprising:
assessing the total number of communications subscriber line pairs available within a bonding group over which data packets are to be communicated across a bonded communications channel;
fragmenting the data packets into packet fragments within the at least one bonding engine of at least one telecommunications access module such that the maximum packet fragment size is adapted to the number of communications line pairs forming the bonding group;
distributing the packet fragments among the total number of the subscriber line pairs within the bonding group; and
transmitting the packet fragments along the bonded communications channel.

8. The method according to claim 7, comprising forming the bonding group as the total number of subscriber line pairs as an "n" number of subscriber line pairs and the maximum fragment size comprises a packet frame size divided by "n."

9. The method according to claim 7, comprising distributing the maximum packet fragment size on every subscriber line pair forming the bond group.

10. The method according to claim 9, comprising distributing the maximum packet fragment size until the fragmented packet has been transmitted.

11. The method according to claim 7, comprising readjusting the maximum packet fragment size when one of the communications subscriber line pairs within the total number of subscriber line pairs goes out of service.

12. The method according to claim 7, comprising dividing the data packet into "n" number of packet fragments of equal size based on "n" number of idle line pairs during initial provisioning of the at least one telecommunications access module.

13. The method according to claim 7, comprising determining the maximum packet fragment size during provisioning of the at least one telecommunications access module.

14. The method according to claim 7, comprising inserting into each packet fragment a fragment header containing a port address for a respective subscriber line to which the respective packet fragment is assigned and switching the packet fragment to the port address within the telecommunications access module corresponding to the respective subscriber line pair.

15. A method of communicating, comprising:
receiving a provisioning request to configure a plurality of communications subscriber line pairs coupled to a plurality of telecommunications access modules located at a central office as a bonding group forming a bonded communications channel;
assessing the total number of communications subscriber line pairs available within the bonding group over which data packets are to be communicated across a bonded communications channel;
fragmenting the data packets into packet fragments within at least one bonding engine of the telecommunications access modules such that the maximum packet fragment size is adapted to the number of communications line pairs forming the bonding group;
switching the packet fragments within a switching module connected to the telecommunications access modules such that packet fragments are distributed among the total number of the subscriber line pairs within the bonding group forming the bonded communications channel; and
transmitting the packet fragments along the bonded communications channel.

16. The method according to claim 15, comprising forming the bonding group as the total number of subscriber line pairs as an "n" number of subscriber line pairs and the maximum fragment size comprises a packet frame size divided by "n."

17. The method according to claim 15, comprising distributing the maximum packet fragment size on every subscriber line pair.

18. The method according to claim 15, comprising distributing the maximum packet fragment size until the fragmented packet has been transmitted.

19. The method according to claim 15, comprising readjusting the maximum packet fragment size when one of the communications subscriber line pairs within the total number of subscriber line pairs goes out of service.

20. The method according to claim 15, comprising dividing the data packet into "n" number of packet fragments of equal size based on "n" number of idle line pairs during provisioning.

21. The method according to claim 15, comprising inserting into each packet fragment a fragment header containing a port address for a respective subscriber line to which the respective packet fragment is assigned and switching the packet fragment to the port address within the telecommunications access module corresponding to the respective subscriber line pair.

* * * * *